US010315623B2

United States Patent
Iwashita (10) Patent No.: US 10,315,623 B2
(45) Date of Patent: Jun. 11, 2019

(54) MOBILE ELECTRONIC KEY DEVICE AND ELECTRONIC KEY SYSTEM

(71) Applicant: KABUSHIKI KAISHA TOKAI RIKA DENKI SEISAKUSHO, Aichi (JP)

(72) Inventor: Hiroaki Iwashita, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/737,015

(22) PCT Filed: Jun. 20, 2016

(86) PCT No.: PCT/JP2016/068253
§ 371 (c)(1),
(2) Date: Dec. 15, 2017

(87) PCT Pub. No.: WO2017/006755
PCT Pub. Date: Jan. 12, 2017

(65) Prior Publication Data
US 2018/0170313 A1    Jun. 21, 2018

(30) Foreign Application Priority Data
Jul. 3, 2015    (JP) ................................. 2015-134297

(51) Int. Cl.
*G07C 9/00*    (2006.01)
*B60R 25/24*    (2013.01)
*E05B 49/00*    (2006.01)

(52) U.S. Cl.
CPC ............ *B60R 25/246* (2013.01); *B60R 25/24* (2013.01); *B60R 25/245* (2013.01); *E05B 49/00* (2013.01);
(Continued)

(58) Field of Classification Search
CPC ....... B60R 25/246; B60R 25/24; E05B 49/00; G07C 9/00309; G07C 2009/00365; G07C 2009/00388
See application file for complete search history.

(56) References Cited

U.S. PATENT DOCUMENTS 5,937,065 A * 8/1999 Simon ..................... B60R 25/24
380/262
7,688,179 B2 * 3/2010 Kurpinski ........... B60R 25/2036
340/4.1
(Continued)

FOREIGN PATENT DOCUMENTS

JP           3854838      4/2003
JP      2006-161545      6/2006
(Continued)

OTHER PUBLICATIONS

International Search Report, dated Sep. 6, 2016 by the Japan Patent Office (JPO), in International Patent Application No. PCT/JP2016/068253.
(Continued)

*Primary Examiner* — Joseoph H Feild
*Assistant Examiner* — Rufus C Point
(74) *Attorney, Agent, or Firm* — Greenblum & Bernstein, P.L.C.

(57) ABSTRACT

A portable electronic key device starts up only when movement of the portable electronic key device is present on the basis of detection signal Sac of a motion detector. A communication monitoring unit monitors whether or not radio waves Swk periodically transmitted from a vehicle are received. When there is no movement of the portable electronic key device but the portable electronic key device has received or is receiving radio waves from the vehicle, an operation controller maintains the start-up state of the portable electronic key device.

6 Claims, 3 Drawing Sheets

(52) U.S. Cl.
CPC ............... *G07C 9/00309* (2013.01); *G07C 2009/00365* (2013.01); *G07C 2009/00388* (2013.01)

(56) References Cited

U.S. PATENT DOCUMENTS

| | | | | |
|---|---|---|---|---|
| 8,077,011 | B2* | 12/2011 | McBride | B60R 25/245 340/10.1 |
| 9,082,241 | B2* | 7/2015 | Leong | B60R 25/24 |
| 9,086,879 | B2* | 7/2015 | Gautama | B60R 25/406 |
| 9,102,296 | B2* | 8/2015 | Seiberts | B60R 25/2072 |
| 9,380,540 | B1* | 6/2016 | Hermann | H04W 52/18 |
| 10,015,639 | B2* | 7/2018 | Dickow | B60R 16/0231 |
| 2002/0025823 | A1* | 2/2002 | Hara | B60R 25/24 455/456.5 |
| 2004/0127259 | A1* | 7/2004 | Matsunaga | H04W 52/24 455/560 |
| 2006/0097844 | A1 | 5/2006 | Nakashima et al. | |
| 2007/0090965 | A1* | 4/2007 | McCall | G08B 21/24 340/8.1 |
| 2007/0132552 | A1* | 6/2007 | Kurpinski | B60R 25/2036 340/5.72 |
| 2007/0200672 | A1* | 8/2007 | McBride | B60R 25/245 340/5.72 |
| 2013/0176069 | A1* | 7/2013 | Leong | B60R 25/24 327/517 |
| 2014/0253287 | A1* | 9/2014 | Bauman | G07C 9/00309 340/5.61 |
| 2014/0285319 | A1* | 9/2014 | Khan | G07C 9/00309 340/5.61 |
| 2014/0300448 | A1 | 10/2014 | Ochiai et al. | |
| 2014/0330449 | A1* | 11/2014 | Oman | G01S 13/765 701/2 |
| 2014/0368313 | A1* | 12/2014 | Seiberts | G07C 9/00309 340/5.61 |
| 2014/0375420 | A1* | 12/2014 | Seiberts | B60R 25/2072 340/5.31 |
| 2015/0116079 | A1* | 4/2015 | Mishra | G07C 9/00007 340/5.52 |
| 2015/0161834 | A1* | 6/2015 | Spahl | G07C 9/00111 340/5.61 |
| 2016/0042579 | A1* | 2/2016 | Austen | G07C 9/00309 340/5.61 |
| 2016/0075307 | A1* | 3/2016 | Jakobsson | B60R 25/31 701/2 |
| 2017/0200335 | A1* | 7/2017 | Da Deppo | G07C 9/00309 |

FOREIGN PATENT DOCUMENTS

| | | |
|---|---|---|
| JP | 2009-104237 | 5/2009 |
| JP | 2010-203087 | 9/2010 |
| JP | 2010-216079 | 9/2010 |
| WO | 2013/077100 A | 5/2013 |

OTHER PUBLICATIONS

International Preliminary Report on Patentability, dated Jan. 9, 2018, in International Patent Application No. PCT/JP2016/068253.
Japanese Office Action, dated Nov. 6, 2018, (including English language translation) in the corresponding Japanese Patent Application No. 2015-134297.

* cited by examiner

MOBILE ELECTRONIC KEY DEVICE AND ELECTRONIC KEY SYSTEM

TECHNICAL FIELD

The present invention relates to a portable electronic key device and an electronic key system. More specifically, the present invention relates to an electronic key system including a portable electronic key device that wirelessly transmits an electronic key ID and a lock side communication device that performs verification of the electronic key ID.

BACKGROUND ART

An electronic key system including a portable electronic key device that wirelessly transmits an electronic key ID and a vehicle that performs verification of the received electronic key ID is known. A so-called relay attack in which unauthorized communication is made by using a relay to make unauthorized ID verification (refer to Patent Document 1) is a problem in the field of electronic key systems.

As a countermeasure against this unauthorized communication by using the relay, for example, a technique of, by building an acceleration sensor into a portable electronic key device in advance and determining movement of the electronic key device by acceleration detected by the acceleration sensor, determining validity of the communication is known (refer to Patent Document 2, for example). In a portable electronic key device of Patent Document 2, acceleration data of the portable electronic key device detected by an acceleration sensor is transmitted to a vehicle in a communication process for ID verification. The vehicle determines validity of movement of the portable electronic key device on the basis of the received acceleration data, and for example, when the acceleration is greater than zero and equal to or less than a threshold value, permits unlocking of door(s) of a vehicle.

PRIOR ART DOCUMENT

Patent Document 1: Japanese Laid-Open Patent Publication No. 2006-161545
Patent Document 2: Japanese Laid-Open Patent Publication No. 2010-216079

SUMMARY OF INVENTION

A user who carries the portable electronic key device of Patent Document 2 may sometimes stand and talk for a long time in a state where the user does not move around the vehicle. In this situation, a situation where the acceleration of the portable electronic key device of Patent Document 2 is zero continues. As a result, functions of the portable electronic key device are forcibly turned off. In this case, a valid user is sometimes not able to unlock the vehicle door at the time of getting in the vehicle or not able to start up an engine after getting in the vehicle. The user, for example, vibrates the portable electronic key device in order to let the acceleration sensor detect proper acceleration. This is troublesome for the user.

An object of the present invention is to provide a portable electronic key device including a motion detector, which ensures convenience and security, and provide an electronic key system including the portable electronic key device.

An aspect of the present invention is to provide a portable electronic key device configured to wirelessly communicate with a lock side communication device to perform verification of an electronic key ID, the portable electronic key device including a motion detector configured to detect movement of the portable electronic key device, a key function controller configured to monitor the movement of the portable electronic key device on the basis of a detection signal of the motion detector and enable a predetermined function of the portable electronic key device to permit a predetermined operation when the movement is detected, a communication monitoring unit configured to monitor, when the predetermined function of the portable electronic key device is enabled, whether or not the portable electronic key device is receiving or capable of receiving a radio wave regularly or irregularly transmitted from the lock side communication device, and an operation controller configured to maintain the predetermined function of the portable electronic key device enabled in a period in which the movement of the portable electronic key device after start-up is not detected but the portable electronic key device is capable of receiving the radio wave.

With this arrangement, only when the movement of the portable electronic key device occurs, the predetermined function of the portable electronic key device is enabled. Thus, for example, the portable electronic key device placed in a key holding place, for example, does not respond to unauthorized communication by the third party using a relay. Therefore, the security is ensured against the unauthorized communication using the relay. In addition, after the predetermined function of the portable electronic key device is enabled in accordance with occurrence of the movement of the portable electronic key device, even when the movement of the portable electronic key device is no longer continued but when communication with the lock side communication device is established, the predetermined function of the portable electronic key device is maintained to be enabled. For example, when a valid user does not move around the lock side communication device for a while and after that, the lock side communication device and the portable electronic key device have an opportunity to communicate with each other, communication can be performed immediately. Therefore, the portable electronic key device, which is configured to manage the predetermined function of the portable electronic key device on the basis of an output of the motion detector, and an electronic key system can have ensured convenience and security.

In the above portable electronic key device, preferably, the radio wave is transmitted through ID verification communication in which the portable electronic key device responds upon the communication initiated from the lock side communication device and confirms validity/invalidity of the electronic key ID. With this arrangement, by utilizing the ID verification communication, it becomes possible to determine whether or not start-up of the portable electronic key device is maintained.

In the above portable electronic key device, preferably, the radio wave is a wake signal required for starting up the portable electronic key device at the time of starting the ID verification communication between the portable electronic key device and the lock side communication device. With this arrangement, by utilizing the wake signal transmitted from the lock side communication device, it becomes possible to determine whether or not the start-up of the portable electronic key device is maintained. Thus, when maintaining the start-up of the portable electronic key device, there is no need for transmitting a dedicated radio wave from the lock side communication device.

Preferably, the above portable electronic key device further includes a timer for measuring an elapsed time during which the movement of the portable electronic key device is not detected and during which the radio wave is not received, wherein when a counting value of the timer becomes a threshold value or more, the operation controller disables the predetermined function of the portable electronic key device.

In the above portable electronic key device, preferably, the radio wave has intermittent transmission information indicating a transmission interval of the radio wave, and the communication monitoring unit changes the threshold value of the timer on the basis of the intermittent transmission information. With this arrangement, the threshold value of the timer can be changed in accordance with the transmission interval of the radio wave transmitted from the lock side communication device. Thus, it is advantageous to more correctly set how long the start-up of the portable electronic key device is maintained.

Preferably, the predetermined function includes a communication function for performing verification of the electronic key ID.

Another aspect of the present invention is to provide an electronic key system including a lock side communication device and a portable electronic key device configured to wirelessly communicate to perform verification of an electronic key ID, wherein the portable electronic key device includes a motion detector configured to detect movement of the portable electronic key device, a key function controller configured to monitor the movement of the portable electronic key device on the basis of a detection signal of the motion detector and enable a predetermined function of the portable electronic key device to permit a predetermined operation when the movement is detected, a communication monitoring unit configured to monitor, when the predetermined function of the portable electronic key device is enabled, whether or not the portable electronic key device is receiving or capable of receiving a radio wave regularly or irregularly transmitted from the lock side communication device, and an operation controller configured to maintain the predetermined function of the portable electronic key device enabled in a period in which the movement of the portable electronic key device after start-up is not detected but the portable electronic key device is capable of receiving the radio wave.

With some aspects of the present invention, a portable electronic key device including a motion detector, which ensures convenience and security, and an electronic key system including the portable electronic key device are obtained.

EMBODIMENTS OF THE INVENTION

One embodiment of a portable electronic key device and an electronic key system will be described below.

Figure 1:
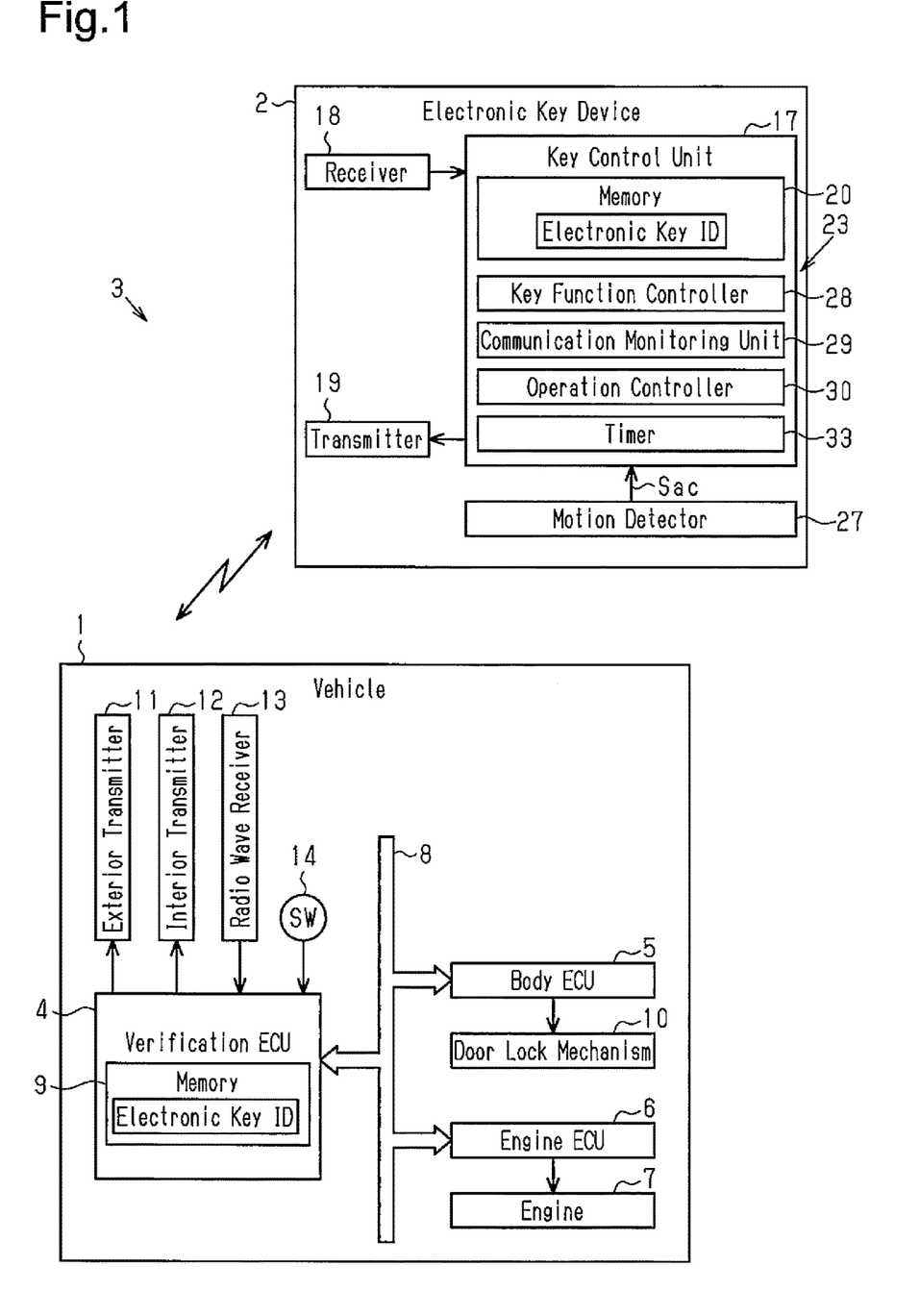
FIG. 1 is a schematic diagram of a portable electronic key device and an electronic key system of one embodiment.

As illustrated in FIG. 1, an electronic key system 3 includes a vehicle 1, which is an example of a lock side communication device, and a portable electronic key device 2. The vehicle 1 and the portable electronic key device 2 are configured to wirelessly communicate with each other to perform verification of an electronic key ID. The electronic key system 3 can be a key operation-free system that executes ID verification by short range wireless communication (with a communication distance of a few meters) upon communication from the vehicle 1. In the following description, the ID verification by the key operation-free system will sometimes be referred to as "smart verification," and communication of the ID verification will sometimes be referred to as "smart communication."

The vehicle 1 includes an verification ECU (Electronic Control Unit) 4 that performs the ID verification (smart verification), a body ECU 5 that manages a power state of in-vehicle electronic components, and an engine ECU 6 that controls an engine 7. These ECUs are connected through an in-vehicle communication bus 8, and may form, for example, a CAN (Controller Area Network) or a LIN (Local Interconnect Network). In a memory 9 of the verification ECU 4, one or more valid electronic key IDs of the portable electronic key device registered in the vehicle 1 are written and stored. The electronic key IDs can be digital bit string(s). The body ECU 5 controls an operation of a door lock mechanism 10 that switches locking/unlocking of a vehicle door.

The vehicle 1 includes an exterior transmitter 11 that transmits a radio wave to exterior of the vehicle compartment, an interior transmitter 12 that transmits the radio wave to the interior of the vehicle compartment, and a radio wave receiver 13 that receives the radio wave in the vehicle 1. The exterior transmitter 11 and the interior transmitter 12 transmit a radio wave of an LF (Low Frequency) band, for example. The radio wave receiver 13 receives a radio wave of a UHF (Ultra High Frequency) band, for example. In such a way, in the electronic key system 3 of the present example, the radio wave from the vehicle 1 is of the LF band, and the radio wave from the portable electronic key device 2 is of the UHF band that reaches farther away than the LF radio wave, and LF-UHF two-way communication is thus provided.

The vehicle 1 includes an engine switch 14 to be operated when the vehicle power state is switched. The engine switch 14 is formed by, for example, a push momentary switch. The vehicle power state can be transitioned into any state among IG-off, ACC-on, IG-off, engine start by operating the engine switch 14.

The portable electronic key device 2 includes a key control unit 17 that controls actions of the portable electronic key device 2, a receiver 18 that receives the radio wave in the portable electronic key device 2, and a transmitter 19 that transmits the radio wave in the portable electronic key device 2. In a memory 20 of the key control unit 17, unique electronic key IDs of each portable electronic key device 2 are stored. The receiver 18 receives, for example, the LF radio wave. The transmitter 19 transmits, for example, the UHF radio wave.

Figure 2:
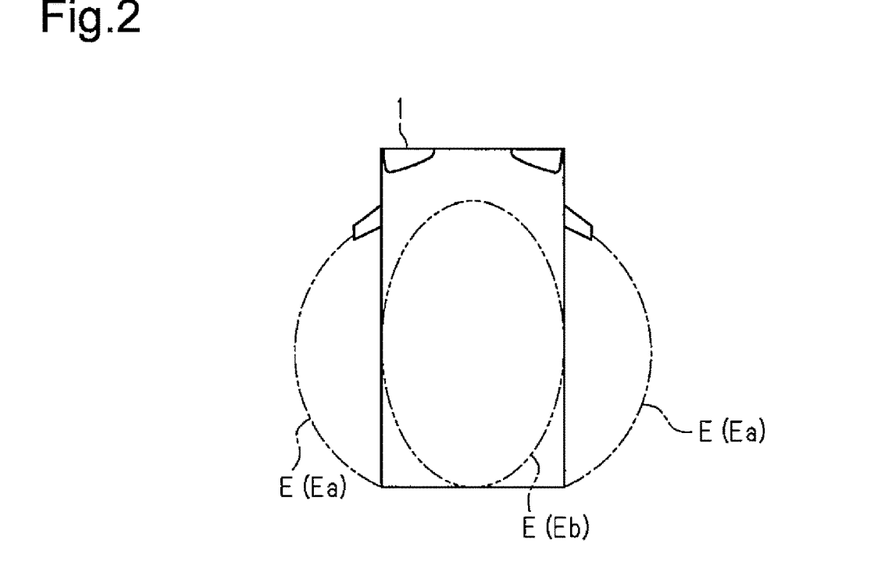
FIG. 2 illustrates LF radio wave areas formed in a vehicle.

As illustrated in FIG. 2, the vehicle 1 forms a communication area E of the LF radio wave by the exterior transmitter 11 and the interior transmitter 12 in order to execute the smart verification with the portable electronic key device 2. In a case of the present example, the communication area E includes a communication area Ea formed by the exterior transmitter 11, and a communication area Eb formed by the interior transmitter 12. When the portable electronic key device 2 placed exterior of the vehicle enters the communication area Ea, the ID verification is executed exterior of the vehicle (vehicle exterior smart verification). When the portable electronic key device 2 placed interior of the vehicle enters the communication area Eb, the ID verification is executed interior of the vehicle (vehicle interior smart verification).

Figure 3:
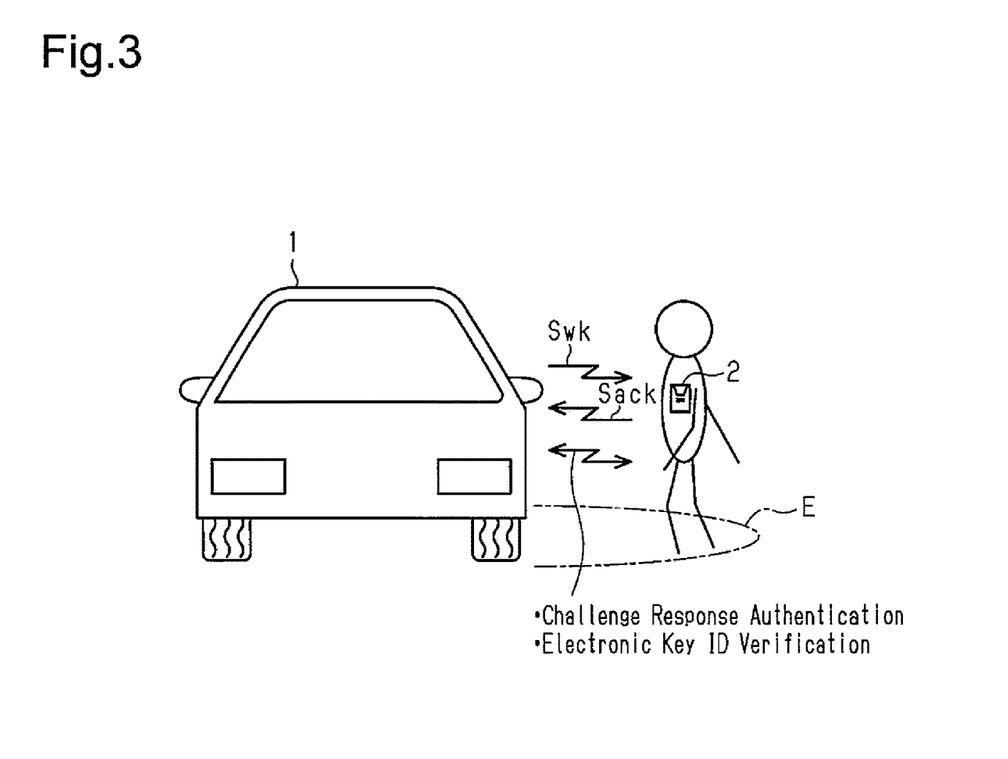
FIG. 3 is a schematic diagram explaining communication logic of ID verification (smart verification).

As illustrated in FIG. 3, in order to confirm whether or not the portable electronic key device 2 enters the communication area E of the LF radio wave (vehicle exterior communication area Ea) formed by the exterior transmitter 11 (interior transmitter 12), the vehicle 1 (verification ECU 4) regularly transmits a wake signal Swk to start up the portable electronic key device 2 from the exterior transmitter 11 (interior transmitter 12). When receiving the wake signal Swk transmitted from the vehicle 1, the portable electronic key device 2 is started up upon receiving the wake signal Swk. After the start-up, the portable electronic key device 2 UHF-transmits a positive acknowledgement signal Sack to the vehicle 1.

When receiving the positive acknowledgement signal Sack from the portable electronic key device 2 within a fixed time period after transmitting the wake signal Swk so that smart communication is established, the verification ECU 4 thereafter executes various types of verification and authentication in the smart verification. The smart verification includes vehicle code verification in which a unique vehicle code of the vehicle 1 is authenticated, challenge response authentication by using an encryption key, and portable electronic key device ID verification in which the electronic key ID is authenticated. The verification ECU 4 confirms whether or not these verification (authentication) are all made with the portable electronic key device 2 with which communication is established.

When confirming that the smart verification upon the portable electronic key device 2 receiving the wake signal Swk transmitted from the exterior transmitter 11 is made, the verification ECU 4 determines that the vehicle exterior smart verification is made, and permits or executes a locking/unlocking operation of the vehicle door by the body ECU 5. When confirming that the smart verification upon the portable electronic key device 2 receiving the wake signal Swk transmitted from the interior transmitter 12 is made, the verification ECU 4 determines that the vehicle interior smart verification is made, and permits transition of the vehicle power state by the operation of the engine switch 14 in a driver's seat.

Returning to FIG. 1, an unauthorized communication establishment prevention system 23 includes an unauthorized communication establishment prevention function of preventing ID verification (smart communication) from being made on the basis of unauthorized communication establishment by using, for example, a relay (unauthorized communication establishment prevention system 23). When the lock side communication device (such as the vehicle) 1 and the portable electronic key device 2 execute the ID verification (smart verification) according to the LF-UHF communication, the unauthorized communication establishment prevention system 23 performs motion determination in which movement (vibration) of the portable electronic key device 2 is confirmed. When the ID verification is made and occurrence of or duration of the movement of the portable electronic key device 2 can be confirmed in the motion determination, the unauthorized communication establishment prevention system permits the ID verification to be made. The unauthorized communication establishment prevention system 23 can include one or more processors.

In this case, the portable electronic key device 2 includes a motion detector 27 that detects the movement of the portable electronic key device 2. The motion detector 27 outputs a detection signal Sac in accordance with the movement of the portable electronic key device 2 to the key control unit 17. The motion detector 27 is configured to detect, for example, movements in three-axis directions of the X axis, the Y axis, and the Z axis. By monitoring the detection signal Sac of the motion detector 27, the key control unit 17 can monitor or detect occurrence of or duration of the movement of the portable electronic key device 2. The three-axis detection type motion detector 27 is preferably, for example, an acceleration sensor and an angular speed sensor.

The portable electronic key device 2 includes a key function controller 28 that controls a predetermined function of the portable electronic key device 2 on the basis of the detection signal Sac of the motion detector 27. The key function controller 28 is provided in the key control unit 17. When the movement (such as vibration) of the portable electronic key device 2 is occurred, the key function controller 28 enables the predetermined function of the portable electronic key device 2 (into an ON state), that is, a start-up state. On the other hand, when the movement (vibration) of the portable electronic key device 2 is not occurred, the key function controller 28 disables the predetermined function of the portable electronic key device 2 (into an OFF state), that is, into a stop state (standby state). The expression "the movement of the portable electronic key device 2 is occurred" also includes the fact that the movement is occurred at the time of determination, and/or the fact that the movement is occurred in a time period (for example, for a few seconds) between the previous time of determination and the current time of determination. The expression "the predetermined function of the portable electronic key device 2" may be all the functions of the portable electronic key device 2, may be at least one selected function, or may be one or more functions excluding a motion detection function, and may include an ID verification communication function.

The unauthorized communication establishment prevention system 23 includes a start-up state management function of managing the start-up state of the portable electronic key device 2 after transition to the start-up state. For example, the start-up state management function is a function of, even when the movement of the portable electronic key device 2 is no longer continued after the portable electronic key device 2 is brought into the start-up state in accordance with the occurrence of the movement, maintaining the portable electronic key device 2 in the start-up state for a while. By doing this, even when a valid user continues not to move near the vehicle 1 for a fixed time period, by maintaining the portable electronic key device 2 in the start-up state, ID verification communication with the vehicle 1 can be performed without any time lag.

In this case, the portable electronic key device 2 (electronic key system 3) includes a communication monitoring unit 29 that monitors whether or not the portable electronic key device 2 in the start-up state receives the radio wave regularly or irregularly transmitted from the lock side communication device (such as the vehicle 1). The communication monitoring unit 29 is provided in the key control unit 17. The radio wave whose reception is monitored by the communication monitoring unit 29 is preferably a radio wave of ID verification communication executed by the portable electronic key device 2 in response to the communication from the lock side communication device. Specifically, the radio wave whose reception is monitored by the communication monitoring unit 29 is preferably the wake signal Swk required for starting up the portable electronic key device 2.

The portable electronic key device 2 (electronic key system 3) includes an operation controller 30 that is capable of maintaining the start-up state even when the movement of the portable electronic key device 2 after the start-up is no longer continued. The operation controller 30 is provided in the key control unit 17. Even when the movement of the portable electronic key device 2 after the start-up is no longer continued but in a time period during which the radio wave (the wake signal Swk in the present example) can be received from the lock side communication device (vehicle 1), the key control unit 17 maintains the portable electronic key device 2 in the start-up state.

Next, by using FIG. 4, actions of the start-up state management function will be described.

Figure 4:
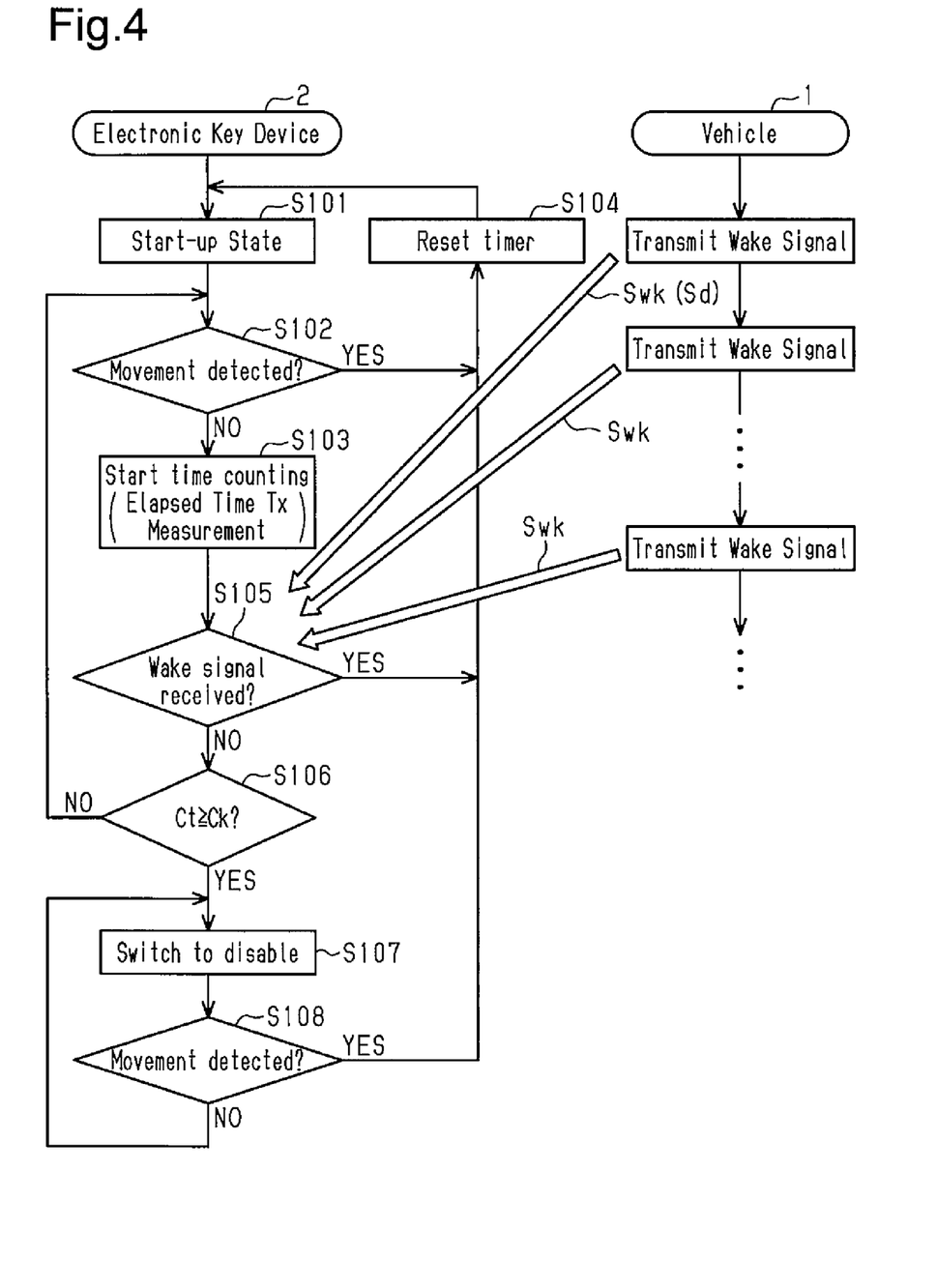
FIG. 4 is a flowchart showing steps of a start-up state management function.

As illustrated in FIG. 4, in order to confirm whether or not the portable electronic key device 2 enters the communication area E of the LF radio wave formed by the exterior transmitter 11 (interior transmitter 12), the vehicle 1 (verification ECU 4) regularly transmits the wake signal Swk to start up the portable electronic key device 2 from the exterior transmitter 11 (interior transmitter 12). The wake signal Swk is repeatedly transmitted at predetermined regular/irregular intervals.

In step S101, when the detection signal Sac according to the movement is input from the motion detector 27, the key function controller 28 brings the portable electronic key device 2 into the start-up state on the basis of the detection signal Sac. That is, the predetermined function of the portable electronic key device 2 is switched from "disabled" to "enabled," so that ID verification communication can be performed in the portable electronic key device 2. Thereby, under a situation where the movement of the portable electronic key device 2 is not generated, the predetermined function of the portable electronic key device 2 is "disabled." For example, even when a third party attempts to make unauthorized communication by using a relay or the like, it is possible to make the portable electronic key device 2 not start up unless the portable electronic key device 2 is held by the user and the movement is generated. Therefore, security is ensured against the action of unauthorized communication by using the relay or the like by the third party.

In step S102, the key function controller 28 determines whether or not the portable electronic key device 2 becomes no-movement (no-vibration) state on the basis of the detection signal Sac of the motion detector 27. That is, after the portable electronic key device 2 is started up, the key function controller determines whether the movement is continuously generated or the movement is no longer continued. At this time, when no-movement of the portable electronic key device 2 is detected, the flow is shifted to step S103. When no-movement of the portable electronic key device 2 is not detected, the flow is shifted to step S104.

In step S103, in order to monitor an elapsed time Tx after the time when the movement of the portable electronic key device 2 is no longer detected, the key function controller 28 starts measurement of a timer 33 (time counting). This is to produce a time delay after the time when the movement of the portable electronic key device 2 is no longer continued until the predetermined function of the portable electronic key device 2 is turned off. This delay contributes to at least convenience.

In step S104, when the key function controller 28 confirms that the movement is generated in the portable electronic key device 2, the timer 33 is reset. That is, the measurement of the elapsed time Tx is reset, and the flow is returned to step S101.

In step S105, the communication monitoring unit 29 determines whether or not the portable electronic key device 2 has received the wake signal Swk while the portable electronic key device 2 is in the start-up state. When the portable electronic key device 2 has received the wake signal Swk, there is a high probability that the portable electronic key device 2 is held by the user who is near the vehicle 1 and is highly likely to perform vehicle operations. On the other hand, when the portable electronic key device 2 has not received the wake signal Swk, there is a high probability that the user holding the portable electronic key device 2 moves away from the vehicle 1. Thus, when the wake signal Swk is not received in step S105, the flow is shifted to step S106. On the other hand, when the wake signal Swk is received, the flow is returned to step S104, the timer 33 is reset, and then the flow is returned to step S101.

In step S106, the communication monitoring unit 29 determines whether or not a counting value Ct of the timer 33 becomes a threshold value Ck or more. The threshold value Ck corresponds to length of a radio wave signal reception determination time period (also called as radio signal reception time window). The counting value Ct being the threshold value Ck or more indicates that the portable electronic key device 2 does not receive the wake signal Swk from the vehicle 1 within the radio wave signal reception determination time period. When the counting value Ct becomes the threshold value Ck or more, the flow is shifted to step S107. When the counting value Ct becomes less than the threshold value Ck, the flow is returned to step S102.

In step S107, the operation controller 30 disables the predetermined function of the portable electronic key device 2 under a condition that the counting value Ct becomes the threshold value Ck or more. That is, the predetermined function of the portable electronic key device 2 is turned off (for example, a power supply is turned off), and the movement of the portable electronic key device 2 is no longer continued. Thereby, even when the third party attempts to establish unauthorized ID verification communication by communication by using the relay or the like, the portable electronic key device 2 does not respond, and the unauthorized communication is not made. Therefore, the security is ensured against establishment of unauthorized ID verification communication.

In step S108, the operation controller 30 determines whether or not no-movement (no-vibration) of the portable electronic key device 2 is generated on the basis of the detection signal Sac of the motion detector 27. That is, the operation controller determines whether or not the movement is generated again in the portable electronic key device 2 after disabling the predetermined function of the portable electronic key device 2. When the movement of the portable electronic key device 2 is not generated, the flow is returned to step S107. On the other hand, when the movement is generated in the portable electronic key device 2, the flow is returned to step S104, the timer 33 is reset, and then the flow is returned to step S101.

As illustrated in FIG. 4, the wake signal Swk may have intermittent transmission information Sd notifying of a time interval at which the wake signal Swk is transmitted. When determining whether or not the portable electronic key device 2 is stopped or maintained in the start-up state, the communication monitoring unit 29 can change the threshold value Ck of the timer 33 on the basis of the intermittent transmission information Sd. This arrangement is advantageous in the vehicle 1 configured to switch a transmission cycle of the wake signal Swk in accordance with, for example, length of a parking time.

With the arrangement of the present embodiment, effects to be described below can be obtained.

(1) In the electronic key system 3 having a movement determination function, after the predetermined function of the portable electronic key device 2 is enabled in accordance with the occurrence of the movement of the portable electronic key device 2, even when the movement of the portable electronic key device 2 is no longer continued but when the communication with the vehicle 1 is established, the predetermined function of the portable electronic key device 2 is maintained to be enabled, that is, the portable electronic key device 2 is maintained in the start-up state. Therefore, when the valid user stops moving around the vehicle 1 for a predetermined time (for example, stands and talks for a long time) and after that the vehicle 1 and the portable electronic key device 2 have an opportunity to communicate with each other (smart communication), the communication can be performed immediately. Thus, the convenience and the security of the portable electronic key device configured to manage the predetermined function of the portable electronic key device 2 on the basis of an output of the motion detector 27 and the electronic key system is ensured.

(2) The radio wave to be used for determining whether or not the start-up of the portable electronic key device 2 is maintained is transmitted through the ID verification communication in which the portable electronic key device 2 responds upon the communication from the lock side communication device (vehicle 1) and confirms validity/invalidity of the electronic key ID. Therefore, by utilizing the ID verification communication, whether or not the start-up of the portable electronic key device 2 is maintained can be determined.

(3) The radio wave to be used for determining whether or not the start-up of the portable electronic key device 2 is maintained is the wake signal Swk required for starting up the portable electronic key device 2 when starting the ID verification (smart verification in the present example) between the vehicle 1 and the portable electronic key device 2. Therefore, by utilizing the wake signal Swk transmitted from the vehicle 1, whether or not the start-up of the portable electronic key device 2 is maintained is determined. Thus, when maintaining the start-up of the portable electronic key device 2, there is no need for transmitting a dedicated radio wave from the vehicle 1.

(4) The threshold value Ck of the timer 33 can be changed to a value in accordance with the transmission intervals of the wake signal Swk on the basis of the intermittent transmission information Sd included in the wake signal Swk. Therefore, the threshold value Ck is optimized. Thus, whether or not the start-up state of the portable electronic key device 2 is maintained can be more correctly determined.

The embodiment is not limited to the arrangement described above but can be changed into the following modes.

Regarding locking/unlocking of a door lock, for example, the door may be locked when a lock button provided in an exterior door handle of the vehicle door is operated, and may be unlocked when a touch operation of the exterior door handle is detected.

Regarding the locking/unlocking of the door lock, for example, the door may be automatically unlocked when the portable electronic key device 2 approaches the vehicle 1, and may be automatically locked when the portable electronic key device moves away from the vehicle 1.

The radio wave to be used for judging whether or not the start-up of the portable electronic key device 2 is maintained is not limited to the wake signal Swk. For example, the wake signal may be changed to the vehicle code or a challenge code transmitted from the vehicle 1 through the ID verification (smart verification) communication.

The radio wave to be used for judging whether or not the start-up of the portable electronic key device 2 is maintained may be changed to various radio waves as long as the radio waves are transmitted from the lock side communication device (vehicle 1).

A structure of the electronic key system 3 may be appropriately changed as needed. For example, the electronic key system 3 may include LF antennas on the left and the right of a vehicle body in place of or in addition to a vehicle interior LF antenna and a vehicle exterior LF antenna. In this case, the electronic key system 3 may determine a position of the portable electronic key device 2 placed interior or exterior of the vehicle from a combination of the radio waves transmitted from these antennas and responses of the portable electronic key device 2 to the radio waves.

The portable electronic key device 2 of the electronic key system 3 is not limited to an electronic key device exclusive for a vehicle but may be formed by a mobile electronic terminal such as a cellular phone with high functionality which may be a smartphone.

A communication format and a frequency used by the electronic key system 3 may be appropriately changed as needed.

The lock side communication device is not limited to a movable device of the vehicle 1 but may be changed to other immovable communication devices.

The present disclosure includes the following implementations. Attached reference signs are for the purpose of not limitation but facilitation of understanding.

[Implementation 1] A portable electronic key device (2) includes:

transmitting and receivers (18, 19) configured to wirelessly communicate with a lock side communication device (1) to perform verification of an electronic key ID of the portable electronic key device (2);

a motion detector (27) that detects movement of the portable electronic key device (2); and a key controller (17) connected to the transmitting and receivers (18, 19) and the motion detector (27), wherein the key controller (17) includes:

a timer (33) that starts counting when the movement of the portable electronic key device (2) is not detected; and one or more processors (23) that reset a counting value of the timer when the transmitting and receivers (18, 19) receive a radio wave (Swk) from the lock side communication device (1), and the one or more processors (23) are configured to disable a predetermined function of the portable electronic key device (2) on the basis of a detection signal (Sac) of the motion detector (27), the counting value of the timer (33), and a threshold value (Ck) of the timer corresponding to length of a radio wave signal reception determination time period.

[Implementation 2] In the portable electronic key device (2) of Implementation 1, the one or more processors (23) are configured to disable the predetermined function of the portable electronic key device (2) when the counting value of the timer (33) becomes the threshold value (Ck) or more.

[Implementation 3] In the portable electronic key device (2) of Implementation 1 or 2, the one or more processors (23) are configured to enable the predetermined function of the portable electronic key device (2) when, after the counting value of the timer (33) becomes the threshold value (Ck) or more, the motion detector (27) detects the movement of the portable electronic key device (2).

It should be apparent to those skilled in the art that the present invention may be embodied in many other specific forms without departing from the scope of the invention. For example, one or more of the components may be omitted from the components described in the embodiments (or one or more aspects thereof). Further, components in different embodiments may be appropriately combined. The present examples and embodiments are to be considered as illustrative and not restrictive, and the invention is not to be limited to the details given herein, but may be modified within the scope and equivalence of the appended claims.

The invention claimed is:

1. A portable electronic key device that wirelessly communicates with a lock side communication device to perform verification of an electronic key ID, the portable electronic key device comprising:
   a motion detector that detects movement of the portable electronic key device;
   a key function controller that monitors the movement of the portable electronic key device on the basis of a detection signal of the motion detector and enables a predetermined function of the portable electronic key device to permit a predetermined operation when the movement is detected;
   a communication monitor that monitors, when the predetermined function of the portable electronic key device is enabled, whether or not the portable electronic key device is receiving or capable of receiving a radio wave regularly or irregularly transmitted from the lock side communication device;
   an operation controller that determines whether or not the movement of the portable electronic key device is detected after start-up of the portable electronic key device, and maintains the predetermined function of the portable electronic key device enabled in a period in which the movement of the portable electronic key device after the start-up is not detected but the portable electronic key device is capable of receiving the radio wave, and
   a timer that starts counting when the operation controller determines that the movement of the portable electronic key device is not detected after the start-up, and measures an elapsed time during which the movement of the portable electronic key device is not detected and during which the radio wave is not received,
   wherein the operation controller disables the predetermined function of the portable electronic key device when a counting value of the timer indicating the elapsed time becomes a threshold value or more.

2. The portable electronic key device according to claim 1,
   wherein the radio wave is transmitted through ID verification communication in which the portable electronic key device responds upon the communication initiated from the lock side communication device and confirms validity/invalidity of the electronic key ID.

3. The portable electronic key device according to claim 2,
   wherein the radio wave includes a wake signal for starting up the portable electronic key device at the time of starting the ID verification communication between the portable electronic key device and the lock side communication device.

4. The portable electronic key device according to claim 1,
   wherein the radio wave has intermittent transmission information indicating a transmission interval of the radio wave, and wherein the communication monitor changes the threshold value of the timer on the basis of the intermittent transmission information.

5. The portable electronic key device according to claim 1,
   wherein the predetermined function includes a communication function for performing verification of the electronic key ID.

6. An electronic key system comprising:
   a lock side communication device; and
   a portable electronic key device, wherein the portable electronic key device and the lock side communication device wirelessly communicate to perform verification of an electronic key ID,
   wherein the portable electronic key device includes
      a motion detector that detects movement of the portable electronic key device;
      a key function controller that monitors the movement of the portable electronic key device on the basis of a detection signal of the motion detector and enables a predetermined function of the portable electronic key device to permit a predetermined operation when the movement is detected;
      a communication monitor that monitors, when the predetermined function of the portable electronic key device is enabled, whether or not the portable electronic key device is receiving or capable of receiving a radio wave regularly or irregularly transmitted from the lock side communication device;
      an operation controller that determines whether or not the movement of the portable electronic key device is detected after start-up of the portable electronic key device, and maintains the predetermined function of the portable electronic key device enabled in a period in which the movement of the portable electronic key device after start-up is not detected but the portable electronic key device is capable of receiving the radio wave, and
      a timer that starts counting when the operation controller determines that the movement of the portable electronic key device is not detected after the start-up, and measures an elapsed time during which the movement of the portable electronic key device is not detected and during which the radio wave is not received,
      wherein the operation controller disables the predetermined function of the portable electronic key device when a counting value of the timer indicating the elapsed time becomes a threshold value or more.

* * * * *